Sept. 8, 1964  R. J. HONEKAMP  3,147,655
METHOD AND APPARATUS FOR TURNING SCREWS
Filed July 17, 1962  5 Sheets-Sheet 1

INVENTOR.
RICHARD J. HONEKAMP
BY
Toulmin & Toulmin
ATTORNEYS

Sept. 8, 1964 R. J. HONEKAMP 3,147,655
METHOD AND APPARATUS FOR TURNING SCREWS
Filed July 17, 1962 5 Sheets-Sheet 3

INVENTOR.
RICHARD J. HONEKAMP
BY
Toulmin & Toulmin
ATTORNEYS

Sept. 8, 1964 R. J. HONEKAMP 3,147,655
METHOD AND APPARATUS FOR TURNING SCREWS
Filed July 17, 1962 5 Sheets-Sheet 4

INVENTOR
RICHARD J. HONEKAMP

BY
Toulmin & Toulmin
ATTORNEYS

Sept. 8, 1964        R. J. HONEKAMP         3,147,655
METHOD AND APPARATUS FOR TURNING SCREWS
Filed July 17, 1962                      5 Sheets-Sheet 5

INVENTOR
RICHARD J. HONEKAMP
BY
Toulmin & Toulmin
ATTORNEYS

United States Patent Office 3,147,655
Patented Sept. 8, 1964

3,147,655
METHOD AND APPARATUS FOR
TURNING SCREWS
Richard J. Honekamp, Loveland, Ohio, assignor to The
R. K. Le Blond Machine Tool Co., Cincinnati, Ohio, a
corporation of Delaware
Filed July 17, 1962, Ser. No. 210,506
8 Claims. (Cl. 82—14)

This invention relates to machine tools and particularly to a machine tool and a method of operating the same for producing screws of variable lead. Still further, this invention relates to a method and apparatus for producing screws having variable root diameters and variable lead.

Screws of the nature referred to, namely screws having varying lead, or both varying lead and variable root diameter, are known and are used in industries where material is to be conveyed by the screws and while simultaneously the material is compressed by the screw. Particular instances in which this is done occur in the field of manufacturing paper, wherein wood fibers and the like, which have been subjected to chemical treatment, are often passed through a station where the liquid is expressed from the fibers by conveying the material through a perforated sleeve by means of a rotating screw which varies in lead and thereby effects gradual compression of the material as it passes along the screw.

In the handling of plastics, as, for example, in the case of certain continuous extrusion machines, variable lead screws are used with the plastic material being delivered to the screw in a bulk condition and gradually compacted as it moves along the screw to a substantially void free state, which may be semi-liquid.

While screws of this nature have been widely employed for conveying and compacting screws, there has not heretofore been any good way of producing these screws. One known way of producing a screw of variable pitch consists of winding the wire about an unmachined work member, said wire having about the lead which the screw is to have. The wire is then welded in place and it is used as a guide to guide the cutting tool during a turning operation.

Such an arrangement is, obviously, crude and inaccurate and is also expensive and time consuming.

The present invention proposes to provide a method and apparatus for turning screws of variable pitch in which manual operations heretofore performed in connection with this work are eliminated, whereby the producing of the screw becomes an entirely automatic operation thereby leading to much more rapid production of the screws and, accordingly, greatly reduced costs of the screws.

The present invention also proposes the provision of a method and apparatus for turning screws of varying lead and which highly accurate end results can be obtained repetitively whereby the performance of machines embodying the screws can be produced accurately and whereby replacement screws and the like can be supplied to existing machines without any change in the operating characteristics of the machine.

Still further, the present invention proposes the provision of a method and apparatus for producing screws which vary in root diameter and in lead simultaneously and with there being entirely independent control arrangements for controlling the variation of the said root diameter and the said pitch whereby in one and the same machine, substantially an infinite variety of accurate screws can be produced rapidly and accurately and, if desired, repetitively for any given type of screw.

The present invention also proposes to produce a turning machine, such as a lathe, capable of producing screws which vary in one or both of root diameter and lead of the screw while the said turning machine can also be employed for conventional turning operations in addition to the highly specialized work of turning the variable screws.

The exact nature of the present invention and the many objectives and advantages thereof will become more apparent upon reference to the following specification, taken in connection with the accompanying drawings, in which.

Figure 3:
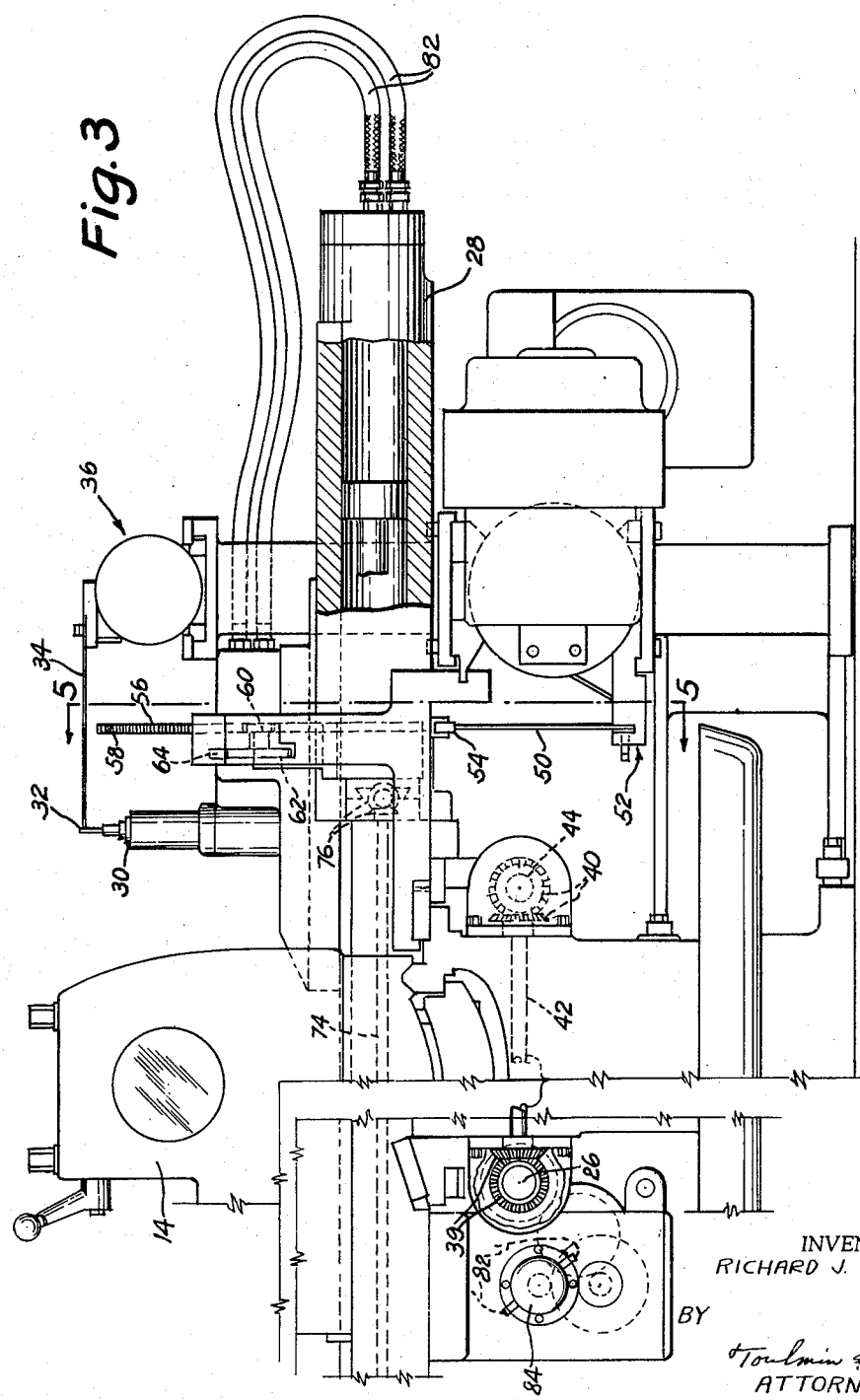
FIGURE 3 is a partial end elevation of the machine looking in from the right end of FIGURE 1 and showing more specifically the manner in which the control templates are supported on the machine.
Figure 4:
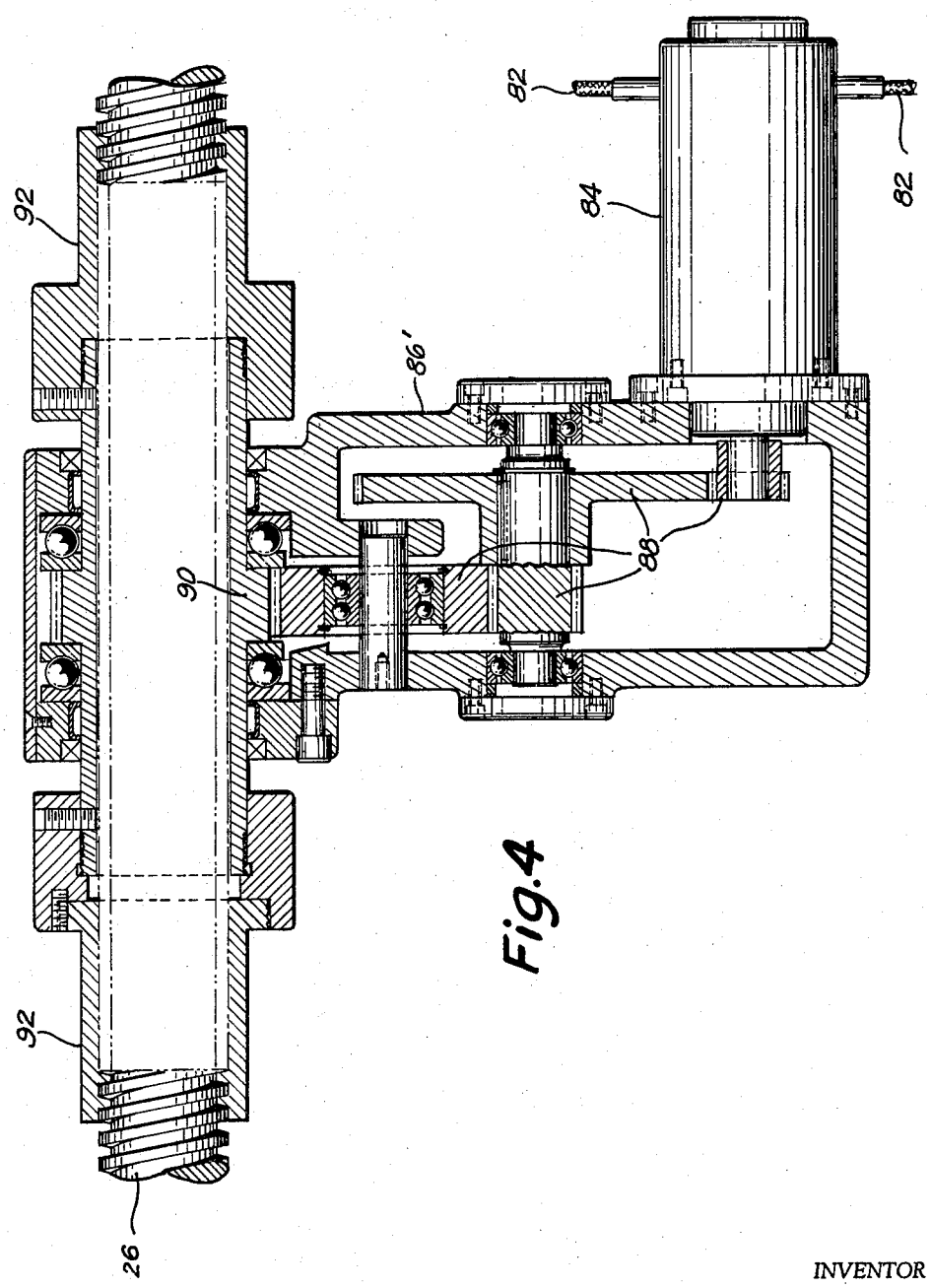
Figure 5:
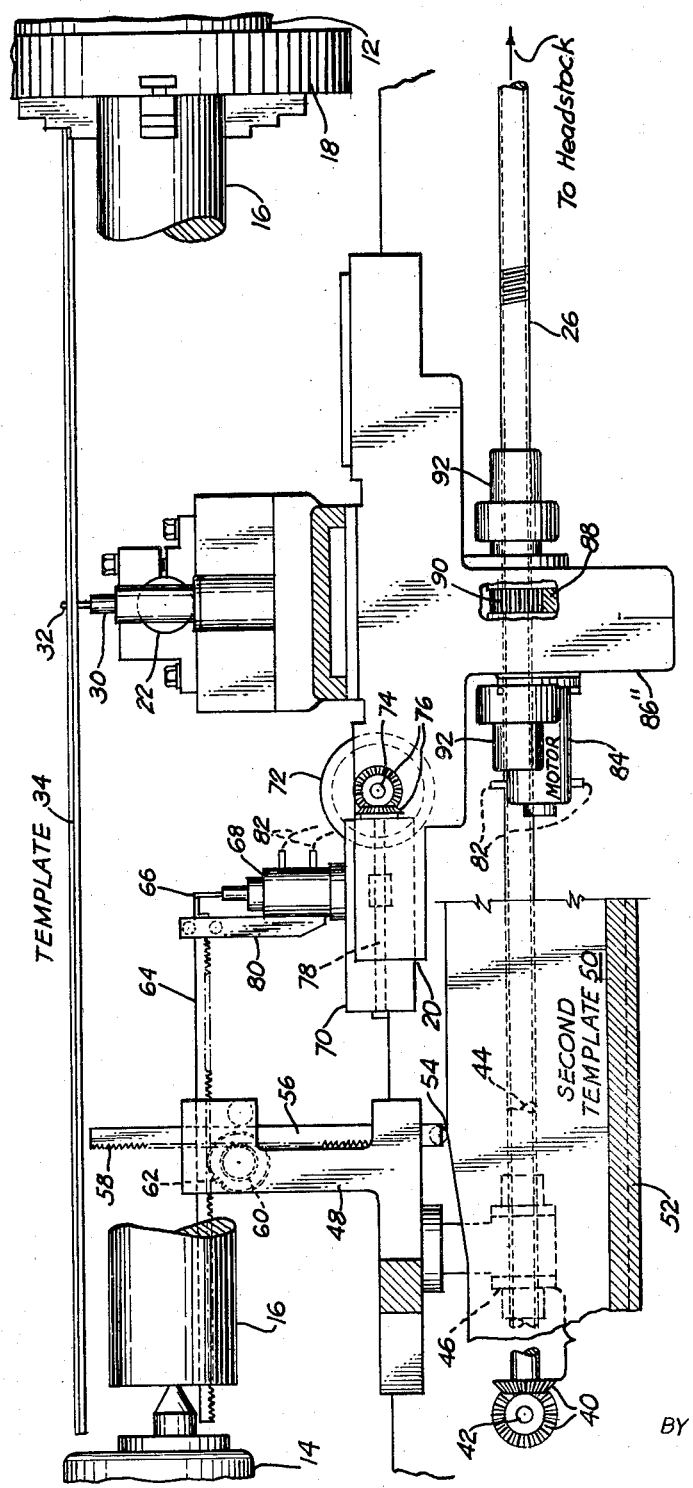

FIGURE 4 is a vertical sectional view showing more in detail the gearing carried by the apron for controlling the speed of movement of the carriage in accordance with one of the templates; and FIGURE 5 is a vertical sectional view indicated by line 5—5 on FIGURE 3 showing the linkage positioned between the lead controlling template and the lead controlling servo motor valve that controls the supply of fluid to the hydraulic motor pertaining to the apron carriage gearing.

*General Arrangement*

A machine according to the present invention comprises the basic elements of a standard lathe, namely, a bed, a headstock and a tailstock on the bed, and a carriage movably mounted on the bed so that it can be moved longitudinally of a workpiece supported between the headstock and tailstock.

According to the present invention, the carriage comprises a cross slide that is under the control of a servo motor that includes a servo valve that is influenced by a first template stationarily mounted relative to the bed of the machine. The first template provides that as the carriage moves longitudinally of the bed, the tool slide, which carries the cutting tool that operates the workpiece, will be adjusted in and out with respect to the work axis of the machine in accordance with the contour of the first template. With the turning of screws, the first template, therefore, determines the root diameter of the screw being turned at each point along the length thereof.

The carriage is driven by a lead screw that is connected with the spindle through conventional headstock gearing so that the normal rate of movement of the carriage bears a fixed ratio to the speed of rotation of the headstock spindle and, therefore, to the speed of rotation of the workpiece. This is essential, of course, for the turning of screws of any type.

According to the present invention, the lead screw engages the carriage by means of a nut arrangement on the carriage which is rotatable on the carriage so that rotation of the nut in one direction will speed up the rate of movement of the carriage while rotation of the nut in the other direction will reduce the speed of movement of the carriage, and, if the nut is held stationarily, the carriage will move at the normal speed as determined by the speed of rotation of the lead screw.

Connected with the said nut through gearing is a hydraulic motor to which fluid is reversibly supplied from a second servo valve that is under the influence of a second template which, similarly to the first template referred to above, is carried stationarily relative to the machine bed.

The reversible control effected over the hydraulic motor referred to can be utilized to vary the lead of the screw being turned in accordance with the position of the carriage along the work member being operated. In the foregoing manner, and by means of two separate and entirely independent control arrangements, the workpiece can be turned to form a screw varying not only in root diameter but also in lead.

Multiple passes of the cutting tool over the workpiece are necessary, of course, to completely turn the screw, and means are provided for adjusting the carriage longitudinally relative to the said second template so that a screw can be formed by a plurality of cuts taken from the workpiece, one cut being immediately adjacent the preceding cut.

Structural Arrangement

Figure 1:
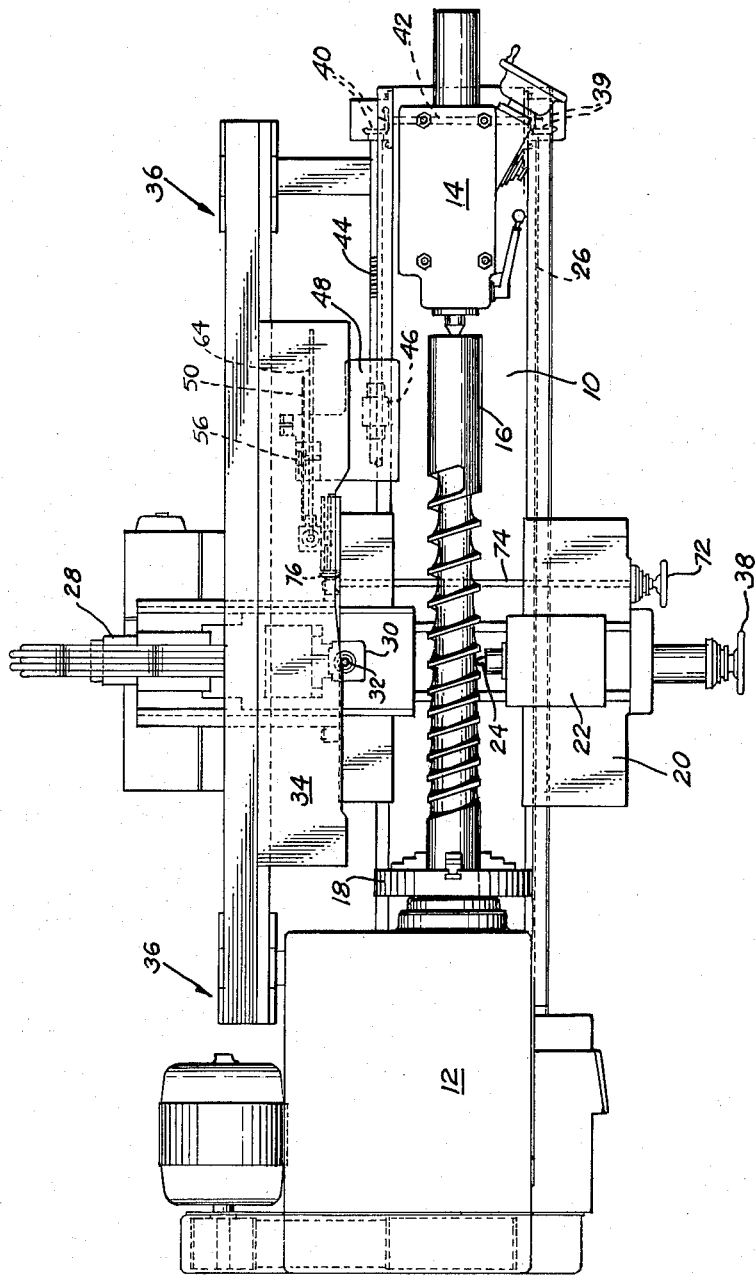
FIGURE 1 is a more or less diagrammatic plan view of a turning machine constructed according to the present invention and showing a turned screw mounted in the machine.

Referring to the drawings somewhat more in detail, wherein a lathe constructed so as to embody the present invention and to practice the method thereof is somewhat diagrammatically illustrated, it will be seen that the machine comprises a bed 10 having at one end a headstock 12 and, at the opposite end, a tailstock 14. The workpiece is illustrated in FIGURE 1 at 16 and, for the sake of clarity, is illustrated in its completely turned appearance.

This workpiece is in the form of a screw which varies in lead from end to end and which also varies in root diameter. The workpiece is clamped to the lathe spindle by chuck means 18 and the chuck means 18 is driven by means of gearing within the headstock.

Slideably mounted on bed 10 is a carriage 20 on which is mounted a tool slide 22. Tool slide 22 carries the forming tool 24 by means of which the workpiece is turned.

According to the present invention, carriage 20 is drawn along bed 10 by a lead screw 26 which is driven by the gearing in the headstock so that a predetermined fixed relationship exists between the speed of rotation of the spindle 18 of the headstock and the lead screw. This would normally provide for constant lead of a screw being turned in the machine.

The tool slide 22 is controlled with respect to lateral movements by being mounted on the carriage which is controlled by a substantially conventional servo motor arrangement which may, for example, be a hydraulic servo motor of a conventional type. In the drawings, the fluid motor of the servo motor is indicated at 28 and the supply of pressure fluid to this motor is reversibly controlled by a servo valve 30 having a follower element 32 engaging a template 34 fixedly mounted relative to bed 10 of the machine by the support means 36.

Initial adjustments of the position of the tool slide can be effected by a handle wheel 38 operatively associated therewith so that the tool can be advanced into operative relation with the workpiece or retracted therefrom, without interfering with the relationship of the servo valve 30 and the template 34.

The foregoing described arrangement provides for control of the lateral position of the tool slide on the carriage with respect to the longitudinal axis thereof thereby to control the root diameter of the workpiece being turned. The template illustrated in FIGURE 1 provides for decreasing of the root diameter toward the right end of the workpiece which is drawn in FIGURE 1 in substantial conformity with the configuration of the template.

The arrangement for controlling the lead of the screw is also servo motor controlled, but is of somewhat different nature than the servo motor control above described.

As will be seen in the drawings, lead screw 26 is connected by gearing 39 and 40 to a transverse shaft 42 at the tailstock end of the bed with a second lead screw 44 extending along the back of the bed. This second lead screw is connected by a nut 46 with a second carriage 48 which is also slideably supported on the bed.

Located beneath the second carriage 48 is a second template 50 fixedly supported relative to the bed by support means 52. Follower means in the form of a roller 54, best seen in FIGURE 5, engages the second template 50 and, in conformity with the configuration of the template, moves vertically as the second carriage 48 moves longitudinally of the bed. Roller 54 is mounted on the lower end of a vertically extending bar 56 that is guided for vertical movements in the second carriage 48.

Toward its upper end, bar 56 takes the form of a rack 58 which meshes with the smaller gear 60 of a compound gear that includes the larger gear 62, said compound gear being rotatably mounted in the second carriage.

A horizontal rack bar 64 is mounted in the second carriage 48 for horizontal movement therein and meshes with the larger gear 62. Rack bar 64 extends leftwardly from second carriage 48 to the region of the follower element 66 of a second servo valve 68 that is mounted on a slide 70 carried by carriage 20. Slide 70, as will be seen, is movable on carriage 20 in the direction of the work axis of the machine.

Adjustment of slide 70 on carriage 20 is effected by hand wheel 72 available at the front of the carriage and which is connected by shaft 74 and gearing 76 with screw 78 which threadedly engages slide 70.

Preferably, the servo valve 68 is provided with a support and guide bracket 80 that slideably supports the servo valve end of rack bar 64.

Servo valve 68 is connected by flexible conduit means 82 with a reversible hydraulic motor 84 mounted on apron 86 that forms a part of the carriage.

Figure 2:
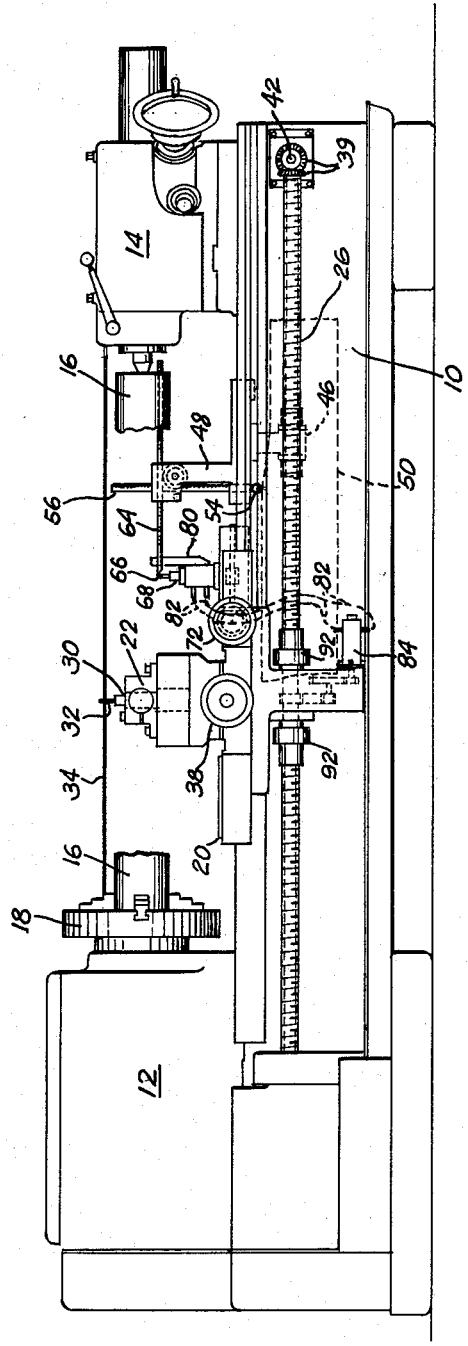
FIGURE 2 is a front elevational view of the turning machine.

As will be seen in FIGURES 2 and 5, the motor 84 is drivingly connected by gearing 88 with a gear 90 forming a part of or fixed to nut means 92 on the apron that provide the threaded connection between the apron and lead screw 26.

Method of Operation

To cut a screw with a varying root diameter and a varying lead, the templates 34 and 50, respectively, can be shaped to obtain the desired configuration and the following operations result:

As the carriage 20 moves longitudinally of the bed, follower element 32 engages template 34 and actuates servo valve 30 which in turn actuates reversible fluid motor 28 to advance forming tool 24 into the workpiece.

As tool 24 advances into the workpiece, carriage 20 moves longitudinally along the bed by lead screw 26. As long as follower 54 (which engages the template 50) moves in a horizontal direction, there will be no motion imparted to vertically extending bar 56 and consequently no change of speed to reversible fluid motor 84 which controls the speed of gear 90. With no change of speed in gear 90, the carriage 20 will move along lead screw 26 at a constant speed and produce a uniform lead on the workpiece.

If, as shown in FIGURE 5, follower 54 begins to descend, bar 56 through the associated linkage will actuate servo valve 68 which in turn will increase the speed of motor 84 and thereby increase the speed of gear 90 and rotate nut means 92. As the speed of nut means 92 is increased, the carriage 20 will be moved along lead screw 26 at a rate faster than the normal rate as determined by the speed of rotation of lead screw and thereby cut a screw having a varying root diameter and a varying lead. The extent of variation of the lead is of course determined by the shape of template 50 and if the template is cut to rotate the nut means 92 in the opposite direction from the above, the speed of the carriage 20 will be reduced from the normal speed as determined by the speed of rotation of the lead screw.

It will be understood that this invention is susceptible to modification in order to adapt it to different usages and conditions and accordingly, it is desired to comprehend such modifications within this invention as may fall within the scope of the appended claims.

What is claimed is:

1. In a lathe for turning screws of variable lead; a bed, headstock means on the bed a tailstock on the bed, said headstock means comprising a spindle for rotating a workpiece supported between the headstock and tailstock, a carriage reciprocable on the bed for supporting a tool to operate the workpiece, a lead screw on the bed geared to said spindle and fixed against axial movement on the bed, a nut rotatable on the carriage threadedly engaging said lead screw, a hydraulic motor on the carriage connected to said nut for rotating the nut to vary the speed of said carriage on said bed, a servovalve on the carriage connected with the motor for controlling the supply of fluid thereto, and a template on the bed which is traversed by the servovalve as the carriage moves along the bed for controlling the servovalve to thereby control the rate and direction of rotation of said motor.

2. In a lathe for turning screws of variable lead; a bed, headstock means on the bed a tailstock on the bed, said headstock means comprising a spindle for rotating a workpiece supported between the headstock and tailstock, a carriage reciprocable on the bed for supporting a tool to operate the workpiece, a lead screw on the bed geared to said spindle and fixed against axial movement on the bed, a nut rotatable on the carriage threadedly engaging said lead screw, a hydraulic motor on the carriage connected to said nut for rotating the nut to vary the speed of said carriage on said bed, a servovalve on the carriage connected with the motor for controlling the supply of fluid thereto, a template on the bed, a template follower engaging the template and driven along the bed in synchronism with the rotation of said lead screw, and linkage connecting said follower with said servovalve for actuation of the servovalve in conformity with the configuration of said template.

3. In a lathe for turning screws of variable lead; a bed, headstock means on the bed, a tailstock on the bed, said headstock means comprising a spindle for rotating a workpiece supported between the headstock and tailstock, a carriage reciprocable on the bed for supporting a tool to operate the workpiece, a lead screw on the bed geared to said spindle and fixed against axial movement on the bed, a nut rotatable on the carriage threadedly engaging said lead screw, a hydraulic motor on the carriage connected to said nut for rotating the nut to vary the speed of said carriage on said bed, a servovalve on the carriage connected with the motor for controlling the supply of fluid thereto, a template on the bed, a second carriage slidable along the bed and connected with said lead screw to be driven thereby, a template follower on said second carriage engaging said template, and means connecting said template follower with said servovalve.

4. In a lathe for turning screws of variable lead; a bed, headstock means on the bed, a tailstock on the bed, said headstock means comprising a spindle for rotating a workpiece supported between the headstock and tailstock, a carriage reciprocable on the bed for supporting a tool to operate the workpiece, a lead screw on the bed geared to said spindle and fixed against axial movement on the bed, a nut rotatable on the carriage threadedly engaging said lead screw, a hydraulic motor on the carriage connected to said nut for rotating the nut to vary the speed of said carriage on said bed, a servovalve on the carriage connected with the motor for controlling the supply of fluid thereto, a template on the bed, a second carriage slidable along the bed and connected with said lead screw to be driven thereby, a template follower on said second carriage engaging said template, and motion amplifying means connecting said template follower with said servovalve.

5. In a lathe for turning screws of variable lead; a bed, a tailstock on the bed, headstock means on the bed, said headstock means comprising a spindle for rotating a workpiece supported between the headstock and tailstock, a carriage reciprocable on the bed for supporting a tool to operate the workpiece, a lead screw on the bed geared to said spindle, a nut rotatable on the carriage threadedly engaging said lead screw, a hydraulic motor on the carriage connected to said nut for rotating the nut, a servovalve on the carriage connected with the motor for controlling the supply of fluid thereto, a template on the bed, a second carriage slidable along the bed and connected with said lead screw to be driven thereby, a template follower on said second carriage engaging said template, a first rack vertically reciprocable in said second carriage and connected to said template follower, a second rack horizontally reciprocable in said second carriage having one end operatively engaging said servovalve, and gearing in said second carriage drivingly interconnecting said first and second racks.

6. In a lathe for turning screws of variable lead and variable work diameter; a bed, a carriage slidable along the bed, a headstock on the bed having a spindle, a leadscrew on the bed geared to the spindle, a nut rotatable on the carriage threadedly engaging said lead screw, a tool supporting slide slidable on the carriage at an angle to the axis of the spindle, first reversible servomotor means connected between carriage and the tool slide, second reversible servomotor means connected to said nut, and first and second templates fixed relative to the bed operable for controlling said first and second servomotors respectively as the carriage moves along the bed.

7. In a lathe for turning screws of variable lead and variable work diameter; a bed, a carriage slidable along the bed, a headstock on the bed having a spindle, a lead screw on the bed geared to the spindle, a nut rotatable on the carriage threadedly engaging said lead screw, a tool supporting slide slidable on the carriage at an angle to the axis of the spindle, first reversible servomotor means connected between carriage and the tool slide, second reversible servomotor means connected to said nut, first and second templates fixed relative to said bed, a first template follower on the carriage engaging said first template and connected to said first servomotor for controlling the position of said tool slide in conformity with the configuration of said first template as the carriage moves along the bed, a second template follower drivingly connected to said lead screw for movement along the bed thereby and engaging said second template and connected with said second servomotor for control of the rate and direction of rotation of said nut in conformity with the configuration of said second template as said carriage moves along the bed.

8. In a lathe for turning screws of variable lead and variable work diameter; a bed, a carriage slidable along the bed, a headstock on the bed having a spindle, a lead screw on the bed geared to the spindle, a nut rotatable on the carriage threadedly engaging said lead screw, a tool supporting slide slidable on the carriage at an angle to the axis of the spindle, first reversible servomotor means connected between carriage and the tool slide, second reversible servomotor means connected to said nut, first and second templates fixed relative to said bed, first and second servovalves on the carriage connected to said servomotors for controlling the supply of actuating fluid thereto, a first template follower engaging the first template and operatively connected to said first servovalve, a second carriage driven by the lead screw, a second template follower on the second carriage engaging said second template, and linkage connecting said second template follower with said second servovalve.

References Cited in the file of this patent

UNITED STATES PATENTS

| | | |
|---|---|---|
| 1,347,789 | Muller | July 27, 1920 |
| 2,169,159 | Moller | Aug. 8, 1939 |
| 2,412,957 | Barnes | Dec. 24, 1946 |
| 2,469,262 | Eggers | May 3, 1949 |
| 2,492,251 | Wills | Dec. 27, 1949 |
| 2,754,711 | Shapiro | July 17, 1956 |
| 2,986,055 | Kasselmann | May 30, 1961 |
| 3,024,684 | Stratman | Mar. 13, 1962 |

FOREIGN PATENTS

| | | |
|---|---|---|
| 17,077 | Great Britain | July 22, 1909 |